W. Z. CONNER.
Weighing Scales.

No. 142,991. Patented September 23, 1873.

Witnesses
W. Bradford
B. [illegible]

Inventor
W. Z. Conner
D. P. Holloway & Co.
Atty.

UNITED STATES PATENT OFFICE.

WILLIAM Z. CONNER, OF SHELBYVILLE, INDIANA.

IMPROVEMENT IN WEIGHING-SCALES.

Specification forming part of Letters Patent No. 142,991, dated September 23, 1873; application filed January 8, 1873.

*To all whom it may concern:*

Figure 1:
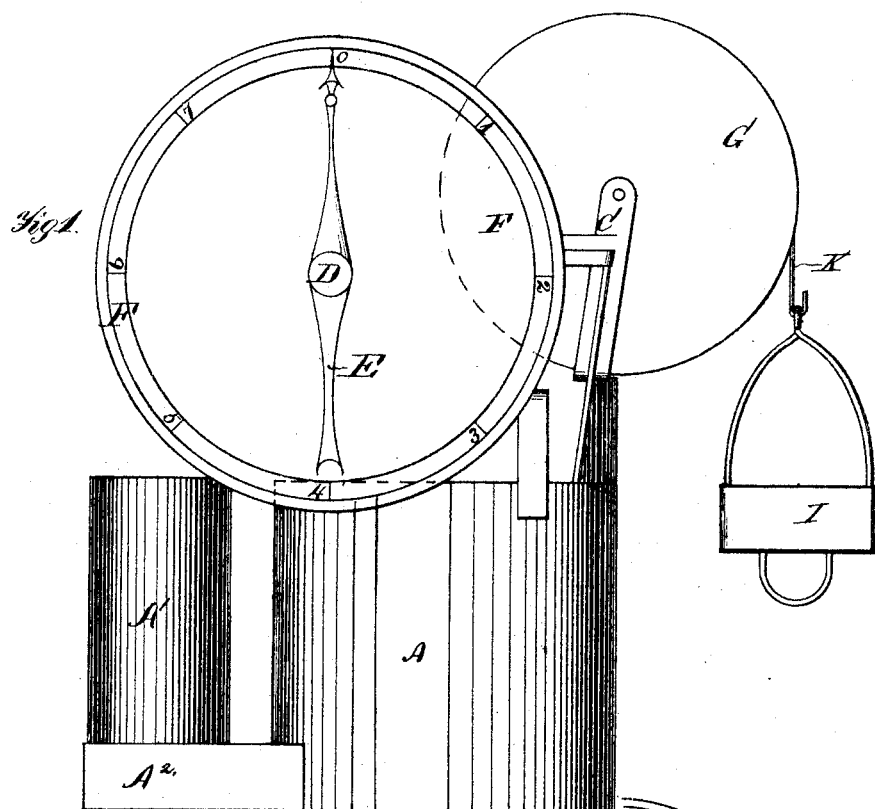
Figure 2:
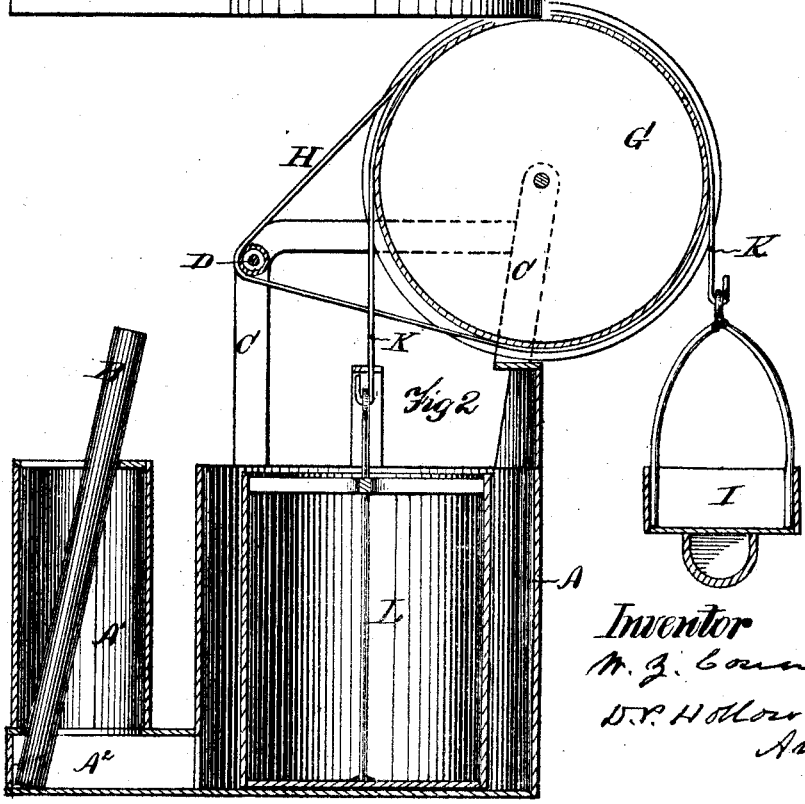

Be it known that I, WILLIAM Z. CONNER, residing at Shelbyville, in the county of Shelby and State of Indiana, have invented certain new and useful Improvements in Weighing-Scales, &c., of which the following is a specification:

In the accompanying drawings, which form a part of this specification, Figure 1 is an elevation of my improved scale, showing a water-reservoir, an equalizing-reservoir, a platform, a drum over which belts pass, a graduated dial, and an indicator-hand; and Fig. 2 is a sectional elevation, showing the water and equalizing reservoirs, the weight or balance receptacle, a rod within the equalizing-reservoir, the shaft which carries the indicator-hand, the belt which moves said shaft, the belt of metal to which the platform is attached, and the drum over which it passes.

Corresponding letters refer to corresponding parts in both of the figures.

This invention relates to scales for determining the weight of different articles; and it consists in the construction, combination, and arrangement of some of the parts of which it is composed, in such a manner as to permit water or other liquids to be used as an element in the operation of the instrument, as will be more fully set forth hereinafter.

In the construction of this type of scales water or some other liquid is made to perform an important function by being caused to float the receptacle or vessel in which the weights are placed to balance the platform, and to fill the space made vacant by the rising of said receptacle, and thus aid in determining the weight put upon the scale.

To enable those skilled in the art to construct and use my improved scale, I will proceed to more particularly describe it.

A reservoir, A, is provided for the reception of the fluid which is to be used. This reservoir is to be of suitable dimensions to allow it to contain the weight vessel or receptacle, and a proper quantity of water or other liquid; and it is made to communicate with another reservoir, $A^1$, through a channel-way, $A^2$, so that, as the weight-receptacle is raised in reservoir A, a portion of the liquid in $A^1$ may pass into A, and aid in filling the space made vacant by the rising of said receptacle. In order that provision may be made for properly adjusting the scale when it weighs either too light or too heavy, rods B, of metal, are provided, which are to be inserted in the liquid-receptacle $A^1$, as shown in Fig. 2, so that, in the event of the scales weighing too heavy, more rods may be inserted into the reservoir; or, in the event of too light weight, some of them may be removed, and thus the height of the column of water in the reservoirs A and $A^1$ will be controlled, and the result aimed at will be accomplished. To provide for supporting the dial, which has the figures upon it for indicating the weight, and the other moving parts of the device, a frame-work, C, is erected upon the top of the reservoir A, it being so arranged that it forms the bearings of a small roller or pulley, D, over which a belt, D', passes, for a purpose soon to be described. Upon the outer end of the shaft of roller or pulley D there is affixed an indicator-hand, E, which is arranged directly in front of a graduated dial, F, which is permanently attached to the frame A, or to some other stationary part of the instrument. This dial is to be so graduated as to show pounds and fractional parts of a pound, according to the position of the indicator-hand with reference to the figures thereon. Within that portion of frame C which is opposite to the point in which the roller D is journaled there are provided bearings for the journals of a shaft, which carries a drum, G, the diameter of which should be several times greater than that of the roller or pulley D, it being so arranged that its surface is parallel with that of said roller or pulley, in order that, as said drum is turned upon its axis, motion may be communicated to said roller or pulley by a belt, H, as shown in Fig. 2, and through it to the indicator-hand. In order that the weight of different articles may be determined, a platform, I, is provided, which is suspended to one end of a metallic or other band, K, which passes over the drum G, and has its opposite end secured to the weight-receptacle L, which is placed within the reservoir A, as shown in Fig. 2.

The arrangement of the parts of this instrument are such that when the reservoirs A and $A^1$ have been supplied with the requisite amount of water, and the weight-receptacle I has been loaded so as to sink it in the reservoir A until the liquid shall come within a short distance of its upper end, it is in a condition to receive upon its platform I the articles to be weighed.

The position of the parts, as above indicated, is shown clearly in Fig. 2 of the drawing; and if while in such position any articles be placed upon the platform I it will be depressed, and the weight-receptacle L will be raised a certain distance, proportionate to the weight in I, and an amount of water the weight of which is equal to the weight of the article to be weighed will occupy the space made vacant by the receptacle. The movement of the platform and of the weight-receptacle will cause the drum G to be partially rotated, which movement will cause a rotation or partial rotation of the roller or pulley D, and thus the indicator-hand will be carried opposite the figures upon the dial, which indicate the weight of the article in platform I.

Having thus described my invention, what I claim, and desire to secure by Letters Patent, is—

1. In a weighing-scale, the combination of a reservoir for water or other liquid, a weight-receptacle, a belt for connecting the parts, a drum over which belts pass, a platform for receiving the article to be weighed, a dial, and an indicator-hand, the parts being constructed and arranged substantially as and for the purpose set forth.

2. The combination of the auxiliary reservoir $A^1$ and the balancing-rods B, substantially as and for the purpose set forth.

In testimony whereof I have signed my name to this specification in the presence of two subscribing witnesses.

WILLIAM Z. CONNER.

Witnesses:
JOHN R. SEDGWICK,
CHARLES M. HARRISON.